United States Patent
Süllau et al.

(10) Patent No.: US 9,505,379 B2
(45) Date of Patent: Nov. 29, 2016

(54) BELT RETRACTOR WITH AN ELECTROMOTIVE WINDING AID AND METHOD FOR ACTIVATING AN ELECTROMOTIVE WINDING AID FOR A BELT RETRACTOR

(71) Applicant: Autoliv Development AB, Vårgårda (SE)

(72) Inventors: Patrick Süllau, Henstedt-Ulzburg (DE); Andreas Lucht, Horst (DE); Hans-Jörg Langhoff, Bönningstedt (DE); Hans-Otto Kock, Kiebitzreihe (DE); Philip Rings, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/769,322

(22) PCT Filed: Feb. 25, 2014

(86) PCT No.: PCT/EP2014/053589
§ 371 (c)(1),
(2) Date: Aug. 20, 2015

(87) PCT Pub. No.: WO2014/131744
PCT Pub. Date: Sep. 4, 2014

(65) Prior Publication Data
US 2015/0375713 A1 Dec. 31, 2015

(30) Foreign Application Priority Data
Feb. 26, 2013 (DE) .......... 10 2013 203 144

(51) Int. Cl.
*B60R 22/46* (2006.01)
*B60R 22/34* (2006.01)
*B60R 22/44* (2006.01)

(52) U.S. Cl.
CPC .............. *B60R 22/46* (2013.01); *B60R 22/34* (2013.01); *B60R 2022/4446* (2013.01); *B60R 2022/4666* (2013.01)

(58) Field of Classification Search
CPC ................. B60R 22/46; B60R 22/34; B60R 2022/4446; B60R 2022/4666
See application file for complete search history.

(56) References Cited

U.S. PATENT DOCUMENTS

| | | | |
|---|---|---|---|
| 6,655,743 B1 * | 12/2003 | Parizat | B60R 22/3413 242/379.1 |
| 2002/0125360 A1 * | 9/2002 | Peter | B60R 22/44 242/374 |
| 2002/0189880 A1 | 12/2002 | Tanaka et al. | |
| 2008/0306656 A1 * | 12/2008 | Baumann | B60R 21/01552 701/45 |
| 2010/0095787 A1 * | 4/2010 | Murphy | B60R 22/46 73/862.391 |
| 2010/0117438 A1 | 5/2010 | Takao et al. | |

FOREIGN PATENT DOCUMENTS

| | | |
|---|---|---|
| DE | 43 32 205 A1 | 3/1995 |
| DE | 10 2004 054 078 A1 | 5/2006 |

(Continued)

OTHER PUBLICATIONS

PCT International Search Report—Apr. 2, 2014.
German Examination Report—Feb. 4, 2014.

*Primary Examiner* — Yuen Wong
(74) *Attorney, Agent, or Firm* — Brinks Gilson & Lione

(57) ABSTRACT

The invention relates to a belt retractor with an electromotive winding aid (4) comprising a belt shaft (1) which is pretensioned in the winding-up direction by a spring and is mounted rotatably in a frame (3) of the belt retractor on which a belt strap (2) can be wound up. The electromotive winding aid (4) can be activated as a function of the belt-strap-retraction speed (BRS).

11 Claims, 2 Drawing Sheets

(56) References Cited

FOREIGN PATENT DOCUMENTS

| | | |
|---|---|---|
| DE | 10 2006 032 066 A1 | 1/2008 |
| EP | 1 642 788 A2 | 4/2006 |
| EP | 1 759 938 A1 | 7/2007 |
| GB | 2 370 540 A | 3/2002 |

* cited by examiner

BELT RETRACTOR WITH AN ELECTROMOTIVE WINDING AID AND METHOD FOR ACTIVATING AN ELECTROMOTIVE WINDING AID FOR A BELT RETRACTOR

CROSS REFERENCE TO RELATED APPLICATIONS

This application claims priority to German Patent Application No. 10 2013 203 144.0 filed on Feb. 26, 2013 and PCT International Patent Application No. PCT/EP2014/053589, filed on Feb. 25, 2014.

FIELD OF THE INVENTION

The invention relates to a seat belt retractor with an electromotive winding aid and a procedure to control an electromotive winding aid for a seat belt retractor.

BACKGROUND

Seat belt retractors with electromotive drives are known in particular as reversible seat belt tensioners which upon activation in a pre-accident phase, pull out any slack present in a safety belt of a seat belt device.

Furthermore, it is also known from DE 43 32 205 C2 how to use the electromotive drive (electric motor) to retract the seat belt in the park position. The electromotive drive is thereby controlled as a function of the insertion state of the belt tongue.

Also provided in the seat belt retractor is a retraction spring which exerts a return force on the seat belt independently of the action of the electromotive winding aid. This return force should for reasons of comfort be as light as possible in the emplaced condition of the seat belt, wherein it must nonetheless be ensured that the seat belt upon removal is reliably wound up in the park position.

Furthermore the retraction springs are subject to basic aging processes, so that the return force of the retraction springs decreases with increasing operating life and the associated high number of use cycles.

The object of the invention is to create a seat belt retractor with an electromotive winding aid which features increased user comfort and enables winding of the safety belt in the park position independently of the return force of the retractor spring, even after a high number of use cycles. In addition, the object of the invention is to create a procedure to control an electromotive winding aid of a seat belt retractor which facilitates improved winding of the seat belt in the park position.

To attain the object, the invention proposes a seat belt retractor and a procedure described herein.

In keeping with the basic idea of the invention it is proposed that the electromotive winding aid can be controlled as a function of the seat belt feed rate. The seat belt feed rate is the parameter that directly characterizes the retraction movement and results from the return force of the retractor spring. In the case where the retractor spring cannot exert the required return force and the seat belt feed rate does not as a result exceed a predetermined boundary value, the electromotive winding aid is activated to support the winding movement of the seat belt so that in this case, too, the seat belt is wound securely.

It is further proposed that the electromotive winding aid is controllable as a function of the current consumption of the winding aid. For the case that the occupant, for example, holds on to the seat belt and thereby impedes the winding movement, the current consumption of the winding aid increases above a predetermined limiting value. In this case the winding aid is deactivated for its own protection.

It is proposed according to one other preferred embodiment of the invention that a memory unit is provided in which various control profiles are stored and the electromotive winding aid is controllable depending on whether the predetermined use cycles of the seat belt controller are exceeded and/or as a function of the sensed ambient temperature according to various control profiles. It has been shown that the return force of the retractor spring decreases with an increasing number of use cycles because of aging and, in addition, is dependent on the ambient temperature. To compensate for these changes of the return force, various control profiles are stored in the memory unit and then serve to control the winding aid when the corresponding parameters are sensed. These control profiles can include various return forces or also return force curves, so that the total return force from the return force of the retractor spring and the winding aid is then constant independently of the aging of the retractor spring and the ambient temperature or corresponds to a predetermined curve.

According to another preferred embodiment of the invention it is proposed that the electromotive winding aid is additionally controllable as a function of the insertion state of a belt tongue lockable in the seat belt lock. By means of the insertion condition of the belt tongue, the buckling or removal of the seat belt can be recognized with certainty. Furthermore, by means of a changing insertion condition of the belt tongue, a conclusion can be drawn about a use cycle, the sum of which allows an indirect conclusion about the aging status of the retractor spring.

It is further proposed that the seat belt retractor have a retractor spring pretensioning the belt shaft in the winding direction, which has a return force of less than 1 N. The proposed small return force facilitates very pleasant wearing comfort of the seat belt for the occupants, wherein the small return force is then increased by means of support from the winding aid to a higher return force to retract the seat belt, and the seat belt is securely wound in the park position.

Furthermore, to achieve the object, a procedure to control an electromotive winding aid of a seat belt retractor is proposed in which the electromotive winding aid is activated when a belt lock sensor senses that the belt tongue is not locked, and a sensor device for sensing the seat belt feed rate senses a seat belt feed rate that is below a predetermined boundary value.

A removed seat belt can be recognized in a first step from a non-locked seat belt tongue. If the seat belt feed rate then does not exceed the predetermined limiting value, it can be concluded that the return force of the retractor spring is not sufficient to wind the seat belt into the park position. In this case the winding aid is then activated and the seat belt is wound with certainty with the support of the winding aid.

It is further proposed that the electromotive winding aid is deactivated if the sensor device to sense the seat belt feed rate senses a seat belt feed rate below a predetermined boundary value and/or the current consumption of the electromotive winding aid exceeds a predetermined boundary value. From the undershooting of a predetermined boundary value of the seat belt feed rate, attainment of the park position, for example, can be sensed, since the seat belt feed rate is equal to zero in the park position and reduced very drastically shortly before reaching the park position and thereby undershoots the predetermined boundary value. Alternatively the winding aid is also then deactivated, if the occupant, for example, holds the seat belt and the current consumption of the winding aid as a result exceeds a predetermined value.

In keeping with another preferred embodiment of the invention it is proposed that a sensor device to sense parameters which characterize the aging condition of a retractor spring pretensioning a belt shaft of a seat belt retractor in the winding direction is provided and the electromotive winding aid is controlled as a function of the aging condition of the retractor spring according to various control profiles. For example, the sensing device can be a belt lock sensor whose insertion procedures are selected in an evaluation unit. In addition, the sensor device can be a position sensor directed at the retractor spring itself. which senses the position of the retractor spring. For the case where a conclusion can be made directly or indirectly about the aging of the retractor spring because of the sensed parameters or the use cycles and a diminishing return force, this diminishing return force is compensated for by control of the winding aid on the basis of an individual control profile provided for this case. This control profile can be formed by a return force of the winding aid increased by a constant factor or by a changed parameter with an individually adapted curve of the return force exerted by the winding aid.

It is further recommended that a sensor device to sense the ambient temperature is provided and the electromotive winding aid is controlled as a function of the ambient temperature according to various control profiles. The return force of the retraction spring can vary independently of its aging status because of the ambient temperature. This change of the return force can then be compensated by the corresponding support of the retraction movement by the winding aid such that the seat belt can again be wound with certainty using a predetermined minimum return force.

BRIEF DESCRIPTION OF THE DRAWINGS

The invention will be explained in the following using a preferred embodiment with reference to the attached figures. Shown thereby are.

DETAILED DESCRIPTION

Figure 1:
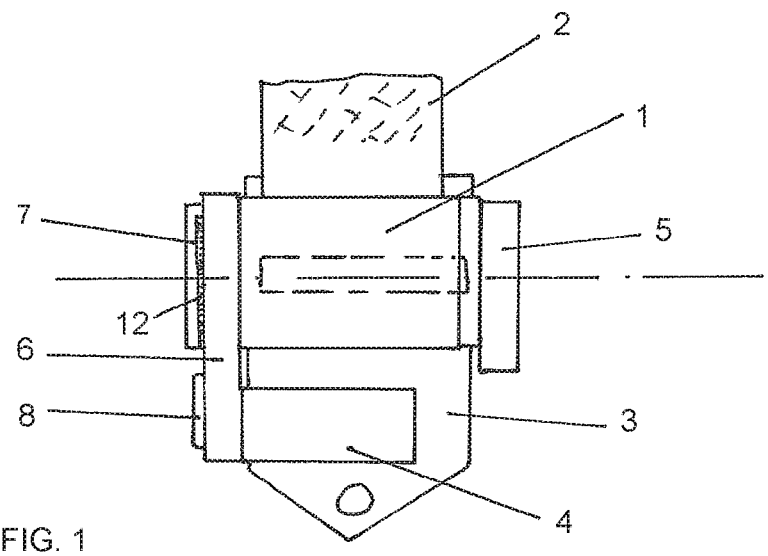
FIG. 1 shows an inventive seat belt retractor with an electromotive winding aid.

Recognizable in FIG. 1 is a seat belt retractor with a two-part belt shaft 1 rotatably positioned in a frame 3 with a force limiting device positioned between the two parts. A seat belt strap 2 of a seat belt device can be wound on the belt shaft body of the two-part belt shaft 1, while the other part of the belt shaft 1 can be locked firmly to the vehicle by a controllable locking device in the frame 3 sensitive to the vehicle or the belt strap, so that the belt shaft body with the wound belt strap 2 can then only turn by means of activation of the force limitation device in the belt extraction direction. The two-part belt shaft 1 is also spring pre-tensioned in the winding direction via a retractor spring 12 held in a spring cartridge 7 which is designed as a very weak retractor spring 12 with a return force of 0.5 to 1.0 N.

The safety seat belt device further includes a guided belt tongue movable on the seat belt 2, a belt lock secured to the vehicle, an end strap secured to the vehicle to fasten the free end of the belt strap to the vehicle structure and, if applicable, a reversing device secured to the vehicle. The named individual parts of the safety seat belt device are not depicted, but can be viewed as known in the prior art.

Figure 2:
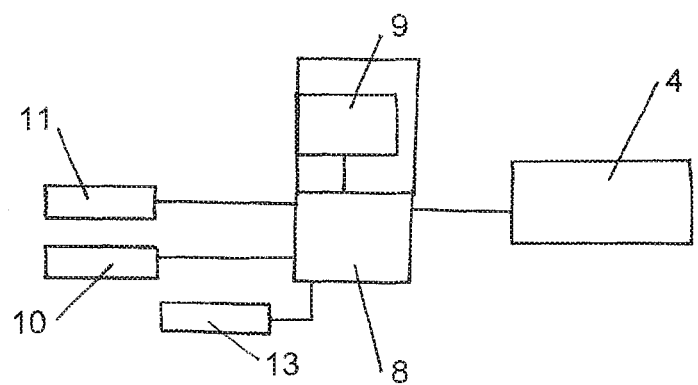
FIG. 2 shows a schematically depicted winding aid with a control device.

Also provided on the frame 3 of the seat belt retractor is an electromotive winding aid 4 in the form of an electric motor which can be coupled via a drive 6 to the belt shaft 1. Provided on the drive 6 is a control unit 8 to control the winding aid 4, as can be recognized in FIG. 2, which is connected by signals to a sensor device 11 to recognize the lock condition BS of the belt tongue in the belt lock, a sensor device 10 to sense the seat belt feed rate BRS, and a sensor device 13 to sense the ambient temperature. The sensor device 10 to sense the seat belt feed rate BRS can, for example, be constructed by a magnet wheel connected in a rotationally-fixed manner to the belt shaft body having a variety of individual magnets with a different alignment and a Hall sensor directed at the magnetic wheel. Also provided in the control device 8 is a memory unit 9 in which various control profiles are stored. The control profiles can comprise individual control data for the electromotive winding aid 4 to produce different return forces acting in the winding direction of the belt shaft 1. In the process both the height and the curve of the return forces are different in the various control profiles. Furthermore the control profiles can be constructed on different retractor springs 12 having different return forces, so that the winding aid 4 can also be used for the seat belt retractor with different retractor springs 12.

The electromotive winding aid 4 is thereby preferably coupled directly to the belt shaft 1 or on the inner end of the retractor spring 12, so that the retractor spring 12 and the winding aid 4 act parallel to the belt shaft 1. As a result, the return forces exerted by the retractor spring 12 and the winding aid 4 on the belt shaft 1 are added together, and even with the failure of the winding aid 4 or the retractor spring 12, a small return force acting on the seat belt 2 is always present.

Figure 3:
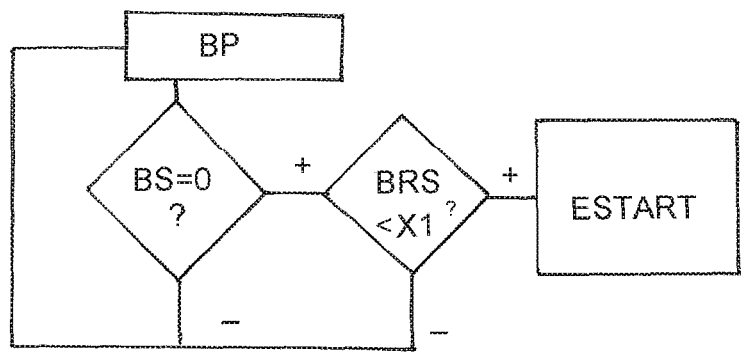
FIG. 3 shows an inventive control logic to activate the winding aid.
Figure 4:
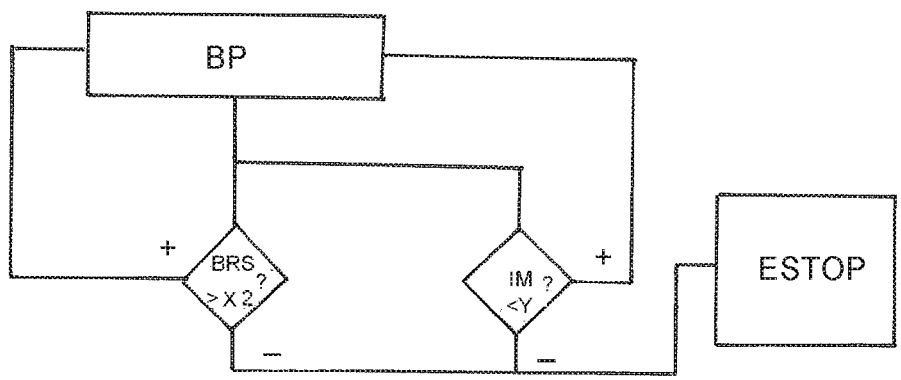
FIG. 4 shows an inventive control logic to deactivate the winding aid.

Depicted in FIG. 3 and FIG. 4 is the control logic of the inventive procedure in the control device 8 to activate and deactivate the winding aid 4.

The winding aid 4 is activated, when the sensor device 11 recognizes a non-locked belt tongue at the conclusion of locking, whereupon the value of BS=1 is set at BS=0 and at the same time a seat belt feed rate BRS is sensed that is below a predetermined first boundary value X1. The activation of the winding aid 4 is depicted as the result ESTART. If one of the criteria is not met, the seat belt is pulled in solely by the retraction spring 12. This result of the query is designated with BP.

After the activation of the winding aid 4, it is again deactivated per the query logic depicted in FIG. 4.

The winding aid 4 is deactivated, when the current consumption IM of the winding aid exceeds a predetermined first boundary value Y or the seat belt feed rate BRS undershoots a predetermined second boundary value X2. For the case that no criterion is satisfied, the winding aid 4 is not controlled, and the activated condition of the winding aid 4 is not changed, so that the belt strap is further wound into the park position with the help of the winding aid 4. This condition is designated as BP. For the case that one of the criteria is met, the winding aid 4 is deactivated. This deactivation is characterized in FIG. 4 with the result ESTOP.

The control of the winding aid 4 thereby occurs according to a cycle, i.e., the control logic is first queried according to the diagram shown in FIG. 3, when after repeated extraction of the seat belt and locking of the belt tongue in the belt lock, the value for the insertion condition of the belt tongue is set at the value BS=1.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor for a seat belt comprising:
a belt shaft rotatably mounted in a frame of the seat belt retractor for winding the seat belt and a retractor spring for pretensioning the seat belt in a direction of winding of the seat belt;
an electromotive winding aid acting on the belt shaft; and
a control device for controlling the electromotive winding aid as a function of a seat belt feed rate,
wherein the retractor spring provides a return force in the direction of winding of the seat belt, and the electromotive winding aid provides a further return force in the direction of winding, such that the return force and the further return force are added together to form a constant total return force or a total return force that corresponds to a predetermined curve to wind the seat belt in the direction of winding.

2. The seat belt retractor according to claim 1, further comprising in that the control device controlling the electromotive winding aid uses a current consumption of the electromotive winding aid as a measure of the seat belt feed rate.

3. The seat belt retractor according to claim 1, further comprising in that a memory device is provided in which various control profiles are stored; and
the electromotive winding aid is controllable by the control device according to the various control profiles as a function of exceeded predetermined use cycles of the seat belt retractor or a sensed ambient temperature.

4. The seat belt retractor according to claim 1, further comprising in that the control device further controlling the electromotive winding aid as a function of the insertion condition of a belt tongue locked in a belt lock.

5. The seat belt retractor according to claim 1, further comprising in that the retractor spring pretensioning the belt shaft in the winding direction has a return force of 0.5 N to 1 N.

6. The seat belt retractor according to claim 1, further comprising the control device storing a plurality of control profiles, the control profiles incorporating one or more of a number of cycles of use of the seat belt retractor, an ambient temperature of the seat belt retractor, and an insertion state of a belt tongue lockable in a seat belt lock.

7. The seat belt retractor according to claim 1, further comprising a sensor device to sense the seat belt feed rate and inputting a signal to the control device.

8. A method to control an electromotive winding aid of a seat belt retractor which acts on a belt shaft to wind a seat belt, the method comprising:
activating the electromotive winding aid, when a belt lock sensor does not sense a locked belt tongue;
providing a sensor device to sense a seat belt feed rate; and
determining, by a control device, the sensed seat belt feed rate is below a predetermined first boundary value,
wherein a retractor spring provides a return force in a direction of winding of the seat belt, and the electromotive winding aid provides a further return force in the direction of winding, such that the return force and the further return force are added together to form a constant total return force or a total return force that corresponds to a predetermined curve to wind the seat belt in the direction of winding.

9. The method according to claim 8, wherein the electromotive winding aid is deactivated when the sensor device senses the seat belt feed rate below a predetermined second boundary value, or when a current consumption of the electromotive winding aid exceeds the predetermined first boundary value.

10. The method according to claim 8, further comprising providing a sensor device to sense parameters which characterize an aging status of the retractor spring pretensioning the belt shaft of the seat belt retractor in the winding direction; and
controlling the electromotive winding aid as a function of the aging status of the retractor spring according to different control profiles.

11. The method according to claim 8, further comprising in that a sensor device is provided to sense an ambient temperature; and
controlling the electromotive winding aid as a function of the ambient temperature according to various control profiles.

* * * * *